United States Patent Office 3,242,780
Patented Mar. 29, 1966

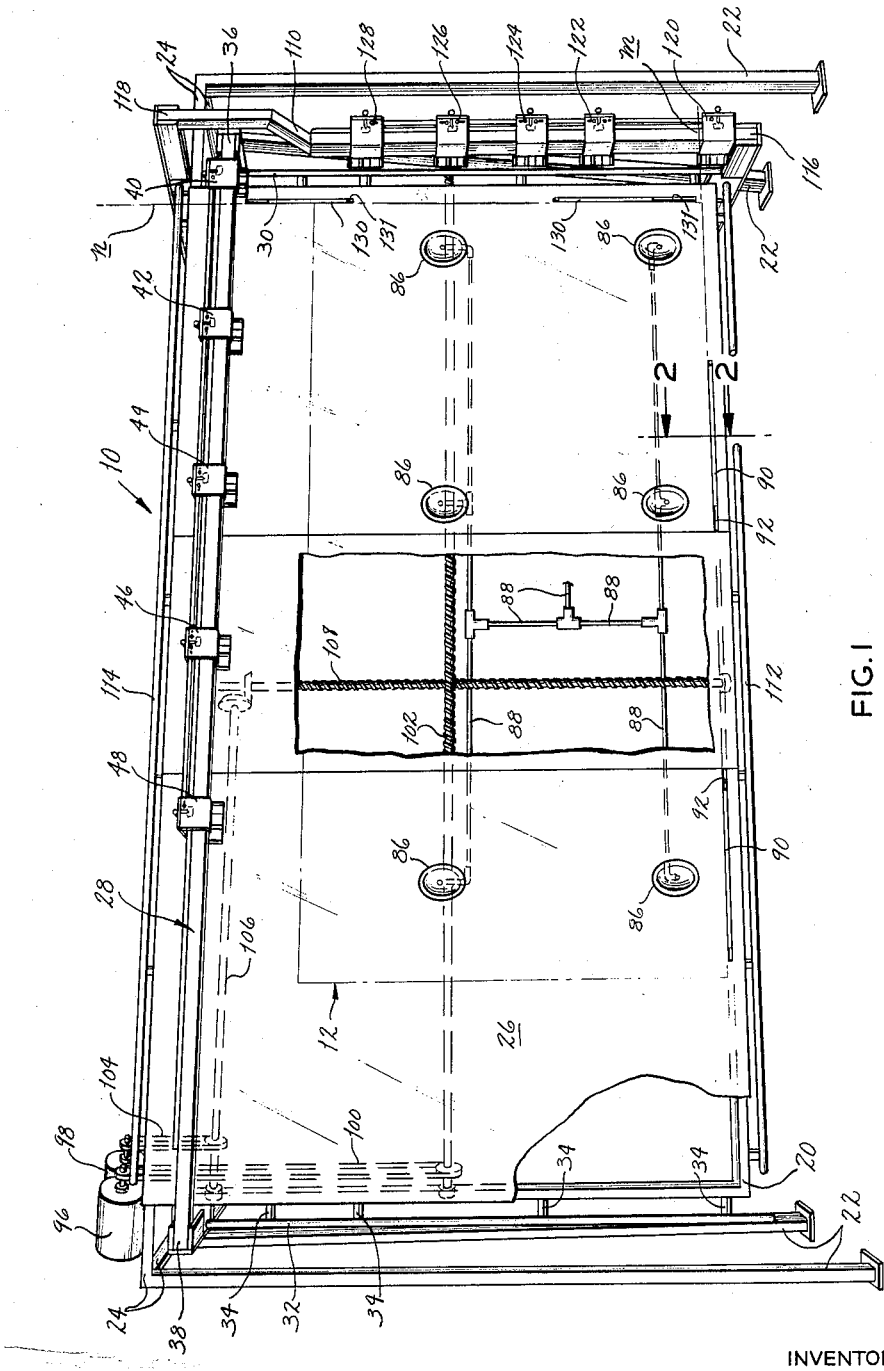

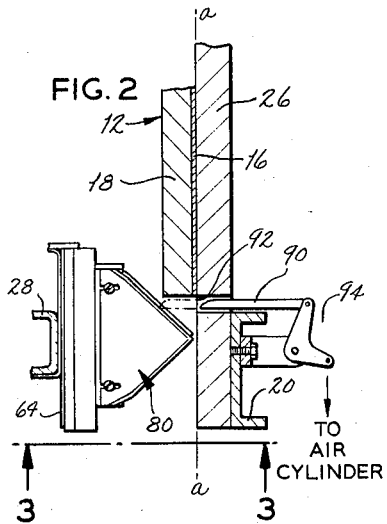
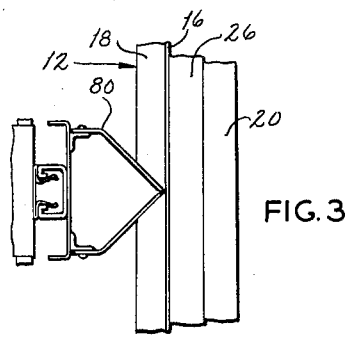
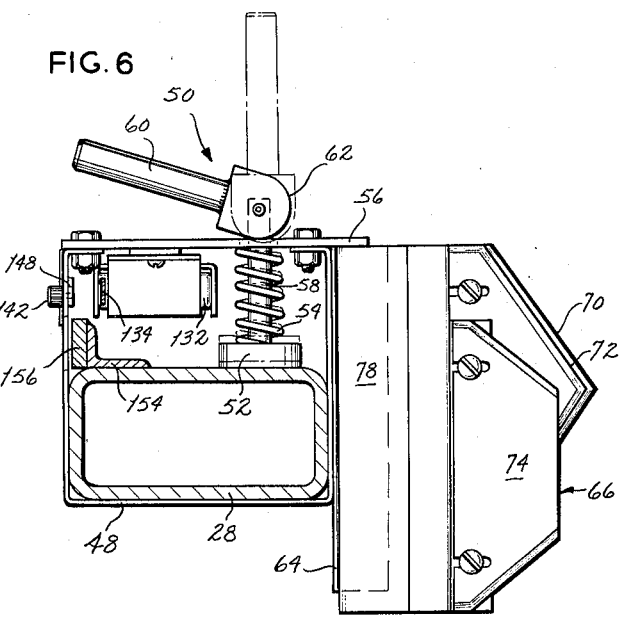
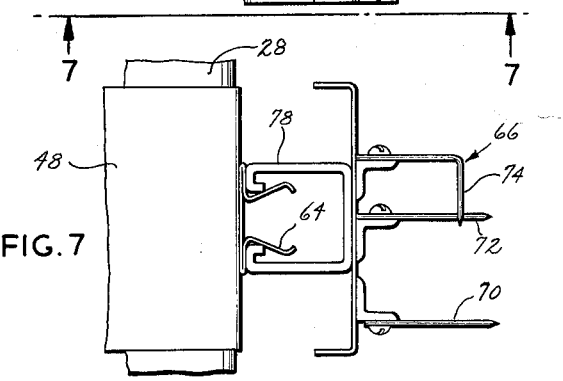
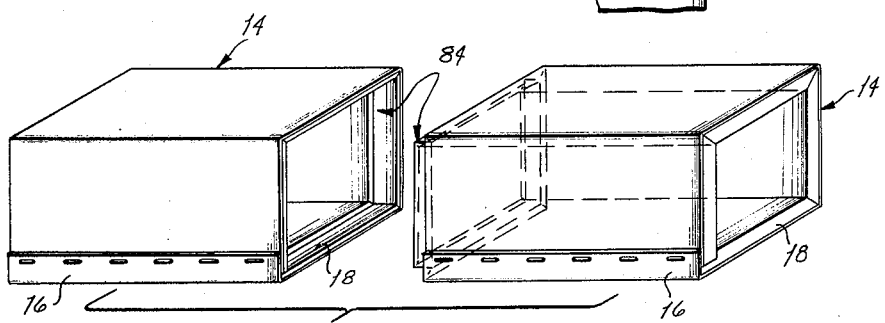

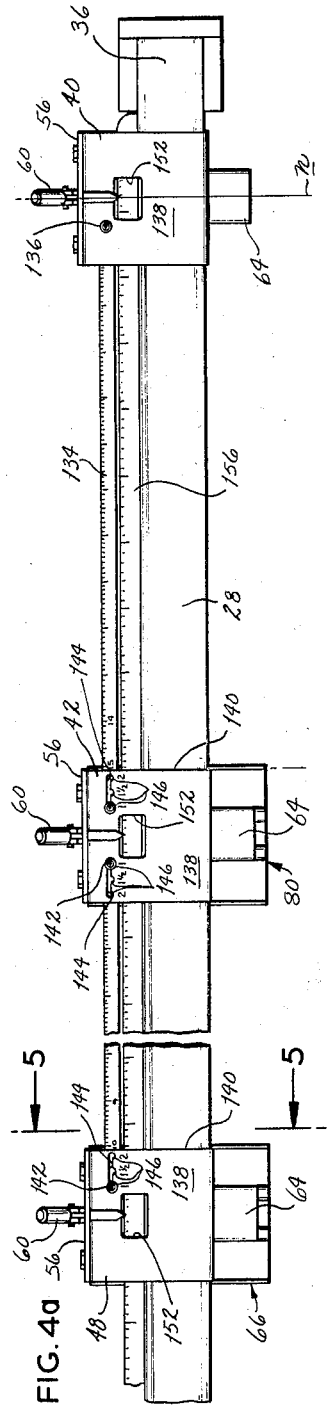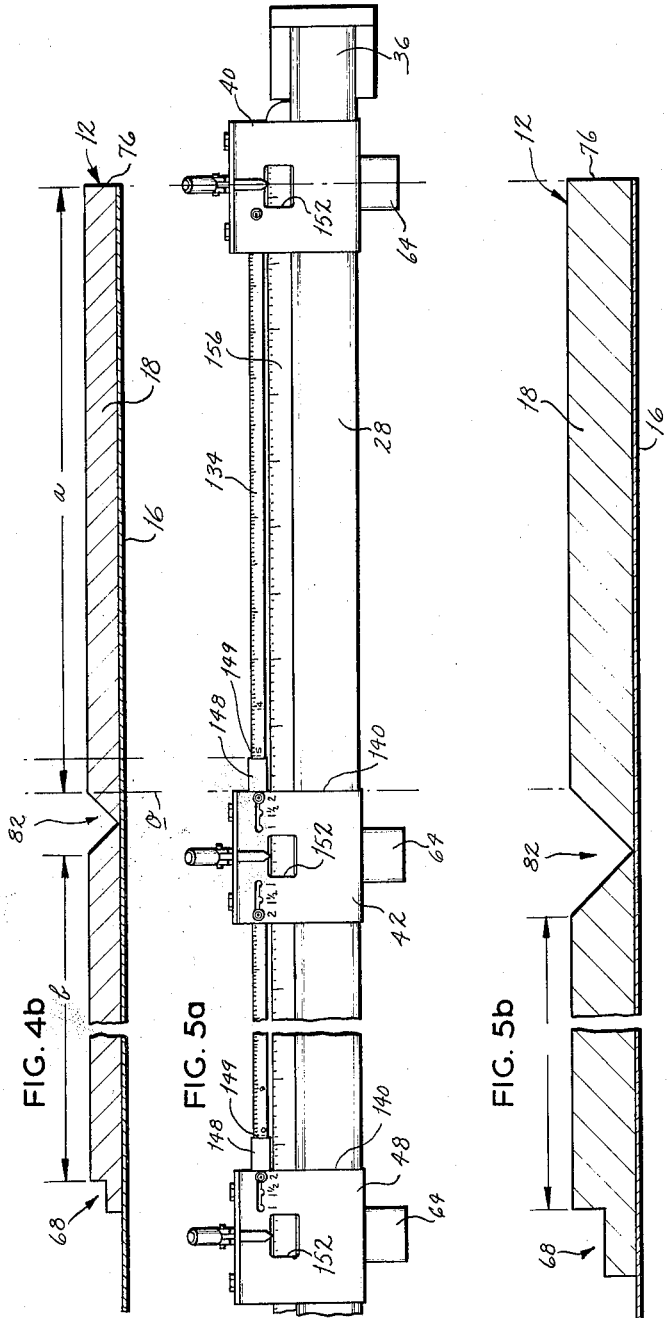

3,242,780
DUCT BOARD GROOVING MACHINE HAVING INSIDE DIMENSION COMPENSATOR
Walter A. Ried, St. Louis, Joseph J. Schrader, Jr., Florissant, and Charles W. Werntz, Ferguson, Mo., assignors to Engel Equipment, Inc., St. Louis, Mo., a corporation of Missouri
Filed May 1, 1964, Ser. No. 364,109
11 Claims. (Cl. 83—5)

The present invention relates generally to apparatus for supporting and performing fabricating operations on flat sheet board material, and more specifically to a single machine for supporting, linearly grooving, and lap-cutting fiber-insulating, sound-suppressing duct board, where the thickness of the different duct board sheets to be cut varies but the inside dimensions of the final duct module are retained.

Since the capacities of air delivery ducts, and the like, are determined by their inside dimensions, architects customarily specify such ducts by inside rectangular dimensions, thus putting the burden on the duct fabricator to make those calculations necessary to compensate for various duct wall thicknesses. Those concerned with the development of duct system fabrication of the non-metallic type have long recognized the need for a machine which would provide the required groove and lapped-end cuts without making calculations for each cut. Furthermore, prior art methods employ but a single manually driven cutter where the duct board material is supported in a horizontal position, requiring an excessive amount of fabrication time. Also, grooved duct board is difficult to handle in horizontal position because the grooves extend substantially the depth or thickness of these duct board sheets, and the board therefore tends to "fold-up." If vertically supported, however, as in the present invention, less space is required and the person supervising the grooving operation may more easily make adjustments and delineate the proper grooving locations.

The general purpose of this invention is to provide a novel machine for supporting sheet board material and performing linear grooving, cutting and like operations thereon, where the final product is a duct module of specified interior dimension. Among the specific objects are the provisions of: a linear grooving and cutting machine which permits facile adjustment of the groove and lap-cut positions without tedious measurements and markings being necessary; apparatus for making V-cuts in flat sheet board material having means for compensating and changing the positions of cutting tools to correspond to a change in thickness of material to be cut, whereby the inside dimensions of the finished modules remain unchanged; a machine for aligning and supporting duct board sheet material to be grooved and cut in a vertically oriented position, wherein the supporting and aligning means do not interfere with the grooving and cutting operations; and a machine which in a single operation is capable of grooving and lap-cutting a duct board sheet either lengthwise or across its width, where the linear positions of the grooves or cuts with respect to an alignment reference point may be varied to compensate for different thicknesses of material to be cut.

In the present invention these purposes (as well as others apparent herein) are achieved generally by providing a movable beam extending from a first end adjacent to a reference point and terminating in a second end remotely therefrom. Upon this movable beam is mounted a tool holding carriage which is adjustable on the beam and capable of being affixed at any position therealong. The tool holding carriage in turn mounts V-type cutting tools which are movable in a vertical path. The movable beam is supported by a vertical frame member which also supports the sheet board material in a vertical plane. Vacuum cups are provided within the vertical frame member to fix the sheet board material permanently during the cutting operation. Retractable guide plates are also housed in the vertical frame member and are extendible to project forward from a back-up surface supported by the vertical frame member. These guide plates extend substantially the thickness of the sheet material to support it temporarily while its longitudinal alignment at the vertical plane is set. After setting a sheet board in alignment, the system of vacuum cups is actuated to fix the position of the board while it is grooved, and the guide plates are then retracted aft and out of the path of the vertical moving cutting tools. A variable length steel tape measure, carried on a reel by the tool holding carriage, has an end fixed at the reference point, thereby to indicate the linear distance from the reference point to the cut to be made by the tool mounted in the tool holding carriage. A compensating index is provided on the tool holding carriage for adjustably compensating the indications of the tape for the thickness of the sheet material to be cut.

Utilization of the invention will become apparent to those skilled in the art from the disclosure made in the following description of a preferred embodiment of the invention, as illustrated in the accompanying drawing, in which:

FIG. 1 is a perspective view showing the front of the sheet material cutting machine with portions broken away to reveal the support frame, drive mechanism, and vacuum suply lines, all located aft of the frame;

FIG. 2 is a fragmentary view, partly in section, taken along the line 2—2 of FIG. 1 and showing a guide plate retracted aft of the sheet material, thereby to permit a grooving tool to groove the sheet without interference;

FIG. 3 is a fragmentary cross-sectional view taken along the line 3—3 of FIG. 2;

FIG. 4a is an elevational view, partly broken away, of one of the movable beams of the present invention and the cutting tools thereon for making grooves and end cuts in a duct board, with the tools spaced to yield a duct module of specified inside diameter;

FIG. 4b is an enlarged cross-sectional view of a duct board shown grooved and end-cut corresponding to the positions of the tools of FIG. 4a;

FIG. 5a is an elevational view of the beam of FIG. 4a with the tool holders moved to new positions for cutting a thicker duct board to form a duct module having the same inside dimensions;

FIG. 5b is an enlarged cross-sectional view of the thicker duct board grooved and end-cut corresponding to the tool positions shown in FIG. 5a;

FIG. 6 is an enlarged cross-sectional view taken along the line 5—5 of FIG. 4a showing the adjustable tool holding carriage mounted on the movable beam and carrying an end-cut tool to provide the end-lap cut of FIGS. 4b and 5b;

FIG. 7 is a cross-sectional view taken along the line 7—7 of FIG. 6; and

FIG. 8 is an exploded perspective view of two duct modules particularly illustrating the inter-fit of such modules.

Referring now to the drawings, wherein like reference characters designate like or corresponding parts throughout the several views, there is shown in FIG. 1 a sheet board material grooving and cutting machine, generally designated 10. A rectangular sheet board having a specified thickness may be supported vertically by the machine 10, as indicated by the dashed outline lines 12 of FIG. 1. When so positioned, the sheet board may be grooved, lap-cut and end-cut in a manner hereinafter described so that the resulting product may be folded into the configuration illustrated in FIG. 8. In the case where the sheet board material 12 is to be fabricated into an air duct module 14, a duct board such as that shown in FIGS. 2, 4b and 5b is selected as the stock sheet board material 12. This duct board consists of a thin outer sheet of backing foil 16 to which is bonded an inner sheet of thick insulating material 18, such as adhered-together glass fibers. The machine 10 supports the uncut duct board material and performs the V-grooving and end-lap cutting necessary to yield the duct module 14.

The grooving and cutting machine 10 has duct board supportive means consisting of a steel vertical frame member 20 suspended by support legs 22 and cross-beam members, such as those shown at 24. A large flat backing sheet 26, made from plywood material or the like, is secured to the frame member 20. The backing sheet 26 is of larger area than the duct board and presents a planar back-up surface to establish a vertical support plane 20 a—a (see FIG. 2) at which the duct board 12 may be supported.

Supported by the vertical frame member 20 on mechanism hereafter described are two movable beams. One of these is a longitudinal beam 28 which is mounted on the vertically extending slide support bars 30 and 32, which are in turn rigidly secured to the frame member 20 by standoff flanges 34. The beam 28 carries bearings (not shown) so that it is free to slide along the bars 30 and 32 in a vertical path. The longitudinally extending beam 28 is set in front of the backing sheet 26 and support plane a—a. It extends from its inboard end 36 adjacent to a reference point indicated at n, to terminate at its remote outboard end 38 adjacent to the slide support bar 32. By supporting the beam 28 in this manner, it is free to move in a vertical path in front of the support plane a—a, that is, transversely to its longitudinally extending direction.

Means to vary the position of the cutting tools linearly and transversely to their direction of travel are mounted for adjustment on the movable beam 28. Such means consist of a plurality of tool holding carriages 40, 42, 44, 46 and 48. The tool holding carriage 40 is positioned adjacent to the reference point n, while the other carriages 42–48 are positioned outboard (to the left in FIG. 1) of this point and spaced from each other at distances which determine the inside dimensions of the completed duct module 14.

As may be best seen from FIG. 6, these carriages 40–48 are provided with clamping means, generally designated 50, to linearly fix each carriage on the beam 28 at a selected position between the reference point n and the remote end 38. The clamping means 50 consists of a steel pad 52 which is urged by the lower end of a coiled compression spring 54 against the upper surface of the beam 28. The upper end of the coiled spring 54 is retained by the undersurface of the top 56 of the tool holding carriage, to thereby secure the carriage to the beam 28 when the spring is extended. A release rod 58 passes vertically through the coiled spring 54 and an aperture in the carriage top 56. The release rod 58 is secured at its lower end to the steel pad 52 and at its upper end to a lever handle 60 having a cam-surface portion 62. The cam-surface 62 is adjacent to the upper surface of the top 56 of the carriage to vary the throw of the release rod as the cam-surface follows the top 56. By swinging the lever handle 60 to the position indicated by the dashed lines, the release rod 58 is moved upwardly, thereby causing the steel pad 52 to further compress the coiled spring 54. The spring 54 releases the frictional engagement between the steel pad 52 and the beam 28 and the carriage 48 is then free to be adjusted by sliding it along the beam 28 to a new position. At the new position it may again be securely fixed to the beam by returning the lever handle to the position shown in FIG. 6. As the handle is returned to this illustrated position, the spring 54 expands to force the steel pad 52 into frictional engagement with the beam 28.

The tool holding carriages 40–48 are provided with tool mount channels 64 onto which the cutting means, now to be described, may be attached. The cutting means may be of any desired configuration to provide the groove, end-lap and other linear cuts. For example, the tri-blade construction of the end-lap cutting tool 66, illustrated in FIG. 6 and FIG. 7, will provide the lap cut designated generally as 68 in FIGS. 4b and 5b. A straight blade 70 cuts entirely through the duct board 12, including the suitable foil backing 16. A second straight blade 72 slices the duct board 12 only to near the inner surface of the foil 16, so that the insulation material 18 outboard thereof, may be peeled from it. A right angle blade 74 slices through the insulating material to provide the notched-out step into which the straight-cut end 76 of the duct board 12 may be lap-fit as shown in FIG. 8. A tool-retaining clamp 78 may be snapped onto the tool mount channel 64 to secure the cutting tool to the carriage.

In FIGS. 2 and 3 the type of grooving tool 80 which provides the V-shaped grooves 82 is shown. This type of cutting tool is carried by the tool carriages 42, 44 and 46, while the inboard and outboard tool carriages 40 and 48, respectively, carry either a straight cut-off tool, an end-lap cutting tool 66, or a cutting tool which provides the interfit cut 84 shown in FIG. 8.

The grooving tool 80 of FIGS. 2 and 3 has dual V-shaped blades, each of which tapers to a point. The points of the blades traverse the insulation material 18 and cut a 90° V-groove in the glass fibrous portion without penetrating the suitable foil backing 16. The 90° groove 82 makes it possible to fold the board into the 90° corner configuration shown in FIG. 8.

Behind the vertical support plane a—a, means are provided to fix the duct material at its support position. Such means preferably include a plurality of vacuum cups 86 mounted within a plurality of spaced apertures in the back-up sheet 26. These vacuum cups 86 extend through the apertures to set flush with the back-up surface, thereby to present suction-like securement of the duct board material. Vacuum supply lines, designated 88, are connectable to a source of vacuum (not shown). When the source of vacuum is energized, the vacuum cups 86 securely fix the duct board 12 in a vertical position for the cutting operation. After the cutting operation has been completed, the duct board may then be released by turning off the source of vacuum. The grooved board, so vertically positioned, may be then removed, without any tendency for it to "fold-up" about its V-grooves.

Means for supporting the duct board material 12 temporarily, while its longitudinal alignment in the vertical support position is set, are provided as an integral part of the grooving machine 10. Such projectable means consists of a plurality of guide plates 90, shown in FIGS. 1 and 2. These guide plates 90 are located along the lower margin of the support position and are retractable from a projecting position forward of the back-up surface, through slots 92 provided in the backing sheet 26, to a retracted position out of the path of the cutting tools (see FIG. 2). In their projecting position these guide plates extend substantially the thickness of the duct board material 12, so that a single operator can readily align the otherwise bulky and awkward sheet material. After the alignment of the duct board 12 has been made and the source of vacuum has been actuated to fix it to the back-up surface, an air cylinder (not shown) may be actuated to pivot the bell crank 94. As the bell crank 94 pivots, it retracts the attached guide plate 90 aft to the position shown in FIG. 2. In this manner, the cutting tool 80 is free to move in a vertical path completely across the duct board and unimpeded by the guide plates 90.

The vertically movable beam 28 is driven along its vertical path and over the retractable guide plates 90 by means of a driving mechanism supported by the frame structure of machine 10. Referring specifically to FIG. 1, there are shown two electrical motors 96 and 98. The electrical motor 96 is mechanically coupled by a drive belt 100 to a longitudinally extending worm gear 102 journaled at each of its ends in the frame member 20. This longitudinally extending worm gear 102 passes through a bearing housed in the second traversable beam, that is, the vertically extending beam 110, which is driven in the longitudinal direction by the worm gear 102. The electrical motor 98 is coupled by a drive shaft 106 and a drive belt 104 to a vertically extending worm gear 108 journaled at its ends in the frame member 20. The worm gear 108 passes through a bearing provided in the longitudinal extending beam 28. Upon actuation of the electrical motor 98, power is transmitted by a drive belt 104 and drive shaft 106 to the worm gear 108. The rotation of worm gear 108 then drives the beam 26 vertically along the slide support bars 30 and 32.

The beam 110 extends vertically and is spaced forwardly of the support position of the duct material 12. It is supported by slide support bars 112 and 114 in the same manner that longitudinal beam 28 is supported. For purposes of measuring in the manner hereinafter described, the beam 110 may be considered as extending from a lower end 116 adjacent to a reference point $m$ which corresponds to the alignment position of the retractable guide plates 90. It terminates at an upper end 118 which is offset forwardly of the remainder of the beam to provide clearance between it and longitudinal beam 28 as it is moved thereover.

Like the longitudinal beam 28, the vertical beam 110 has tool holding carriages 120–128 corresponding to the carriages 42–48. These are mounted for adjustable fixation between the reference point $m$ and the remote end 118. The cutting tools which are mounted by these carriages 120–128 correspond to the respective cutting tools mounted on the tool holding carriages 42–48. This dual beam arrangement, one having a movement in the vertical direction and the other having a movement in the longitudinal direction, permits the duct module fabricator to complete the entire cutting and grooving operation without changing the position of the duct board 12 once it has been fixed in its support position. The grooves and lap-end cuts may be made in one direction by tools carried by one beam, and then the socket type cuts 84 made in a direction perpendicular thereto by passing the tools carried by the other beam across the duct board.

A second set of guide plates 130 similar to guide plates 90 extend through vertical slots 131 provided in the backing sheet 26. These slots have a vertical alignment predetermined with respect to the reference point $n$; thus the duct board material may be fixed to the backing sheet 26 with one of its side edges against the vertical guide plates 130 in a position generally aligned with the reference point $n$. The lower side edge of the duct board is similarly aligned by the guide plates 90 with respect to the other reference point $m$.

Referring now to FIGS. 4a, 4b, 5a and 5b, the position indicating and compensating apparatus for the tool holding carriages will be described. Because the measuring and compensating apparatus associated with the carriages 40–48 is identical to that associated with the carriages 120–130, reference will be made only to that apparatus used in conjunction with the carriages 40–48.

Referring specifically to FIGS. 4b and 5b, there are shown two duct board sheets of differing thicknesses. For purposes of illustration, the duct board of FIG. 4b is assumed to be one inch thick, while the duct board of FIG. 5b is assumed to be two inches thick; it being understood that any other proportional difference of thickness may be taken into account in designing the compensating apparatus. The inside dimensions of the finished duct module 14 are represented by the dimensions $a$ and $b$, which for purposes of illustration are shown as 15 and 10 inches, respectively. It is these dimensions which remain unchanged, even though the grooving machine 10 is operating on duct boards 12 of different specified thicknesses. A comparison of FIGS. 4b and 5b shows that in the grooving of the two-inch duct board, the same grooving tool removes more insulation material 18 than it does in grooving the one-inch duct board, and a greater length of the thicker board is required if the same inside dimensions $a$ and $b$ are to be maintained. The carriages 42 and others outboard of the first carriage 40 are therefore to be moved to the left a distance sufficient to compensate for the greater thickness of this board.

Each carriage 42–48 carries measuring indicia means (preferably the tape measure hereafter described) having one of its ends fixed at a reference point inboard of the carriage by which it is carried, thereby to indicate the linear distance between the reference point and the carriage. In the case of the tool holding carriage 42 located first outboard of the carriage 40, this measuring-indicia means consists of a measuring tape reel 132 (see FIG. 6) carrying a variable length tape measure 134. When the carriage 44 is moved to the right, the tape measure 134 coils inside the reel 132, so as not to interfere with the movement of the carriages along the beam 28.

The inboard tape measure 134 has its zero-reference end 136 fixed to the face plate of carriage 40 and linearly graduated measuring indicia along its outer surface. By moving the carriage 42 along the beam 28 and reading along the edge of an index or indicator (hereafter referred to) at the right side 140 of carriage 42, a linear distance may be set between the reference point $n$ (which is aligned with the center axis of carriage 40) and the near edge of a groove to be cut. Such edge is indicated in FIGS. 4 and 5 by the dashed line $o$. This distance is precisely the inside dimension $a$ which is to be maintained, regardless how thick a duct board is to be cut.

Each of the tool holding carriages 42–48 outboard of the carriage 40 similarly carry a tape reel 132 and tape measure 134 thereon, extending inboard from the carriage and having its zero end fixed to a thickness-index pin 142 carried by the carriage adjacently inboard, as hereafter more fully described.

Except for the inboard tool carriage 40, each tool carriage 42–46 is provided with a pair of longitudinal thickness-index slots 144 symmetrically disposed about a plane passing through the center axis of the carriages and transversely to the beam 28. The thickness-index pins 142 are set by sliding along the thickness-index slots 144 into those thickness-index notches 146 which correspond to the thickness of material to be cut. The thickness-index notches 146 outboard of the plane of symmetry of each carriage are utilized differently from those inboard of the plane of symmetry. The difference is set forth below:

By using the thickness-index notches 146 outboard of the plane of symmetry, the pins 142 are set, thereby to move the zero ends of the tape measures 134 outboard to compensate for the different thicknesses of duct board to be cut. They thus provide a means for changing the zero reference point of each tape measure 134, moving it to the left a precomputed distance.

The thickness-index notches 146 inboard of the plane of symmetry are not physically connected with the tape measures 134. Rather, as shown in FIGS. 5 and 6, the pins 142 received in these notches carry slideably-extensible length-measuring index tabs 148 which project from the right edge 149 of the carriage in front of the tape measure 134 as a pin 142 is moved inboard to the right, farther from the plane of symmetry. The right edge 149 of each length measuring index tab 148 serves as the indicator by which the tape measure 134 is read. The tool holding carriage must be moved to the left in order to read the same length-measuring indication, when cutting the two-inch material, as was read in FIG. 4a for cutting one-inch material.

As to the end-cut tool holding carriage 48, its face plate 138 is provided with a single thickness-index slot 144 having thickness-index notches 146 formed therealong, and a pin 142 is provided in this thickness-index slot with an extensible tab 148 which operates in similar fashion to those just described.

Overall length is important principally in spacing the end carriage 48. It is therefore provided with overall-length reading means and the other carriages 40–46 may conveniently have a similar provision, as illustrated, and now to be described.

In the face plate 138 of the end carriage 48 is an overall length reading window 152. As shown in FIG. 6, an overall-length measuring indicator 156, mounted on an angle 154 secured to the beam 28, passes through each of the tool holding carriages and displays its linearly graduated indicia through such reading windows 152. This permits setting of the overall length to the end-cut carriage tool 48, which may require careful adjustment when carrying a cutting tool to provide the interfit cuts 84 in FIG. 8.

In operation, the guide plates 90 and 130 are moved to their projecting positions by their actuating air cylinders. The duct board material is then placed upon the guide plates and moved to the position where its one end and bottom edges are aligned with the reference points n and m, respectively. The vacuum cups 86 are actuated to securely fix the duct board in its vertical support position against the backing sheet 26. According to the thickness of the duct board 12, thickness compensating settings are made by moving the pins 142 to the corresponding thickness-index notches 146. The clamping means 50 for each carriage are released to permit adjustment of the carriages slideably along their beams. The indications specifying the inside dimensions of the board are then read from the tape measures 134 by viewing along the inboard edges 149 of the extensible tabs 148. Where the overall dimension to the end-cut carriage 48 is to be observed, the indication is read from the overall measuring indicator 156 through the reading window 152. After the cutting tools have been positioned, the electrical motors are sequentially energized to drive their respective movable beams across the duct board. Starting with the beam 110 in position as shown in FIG. 1 and the beam 28 in its lowermost position, a first board is cut and grooved by driving the longitudinally-extending beam 28 to the top of the frame 20 (as shown in FIG. 1) and the vertically extending beam to its outward position. The vacuum source may then be deactuated to release the board so that it may be carried away in its vertical orientation. Another duct board may then be aligned and fixed to the backing sheet 26 and the beams 28 and 110 returned separately, in a second pass, to their original positions. Thus, in one complete cycle of movement, two boards are grooved and end-cut longitudinally and laterally.

When the thickness of the duct material being cut is changed but it is desirable to maintain the same specified inside dimensions, the pins 142 are moved to the thickness-index slots corresponding to the new thickness of material, and the positions of the carriages and cutting tools are set accordingly.

Obviously, many modifications and variations of the present invention are possible in the light of the above teachings. It is therefore to be understood that, within the scope of the appended claims, the invention may be practiced otherwise than as specifically described.

We claim:

1. A machine for supporting sheet board material and performing linear grooving, cutting and like operations thereon, comprising
   cutting means movable in a vertical path,
   means to vary the longitudinal position of said cutting means,
   means supportive of said cutting means and said longitudinal positioning means to establish a vertical plane at which sheet board material may be held in a support position,
   means behind such vertical plane to fix such sheet board material at such support position, and
   means positionable to project laterally from the front of such plane along the lower margin of such support position, whereby to support such sheet material temporarily while its longitudinal alignment at such vertical plane is set,
   such positionable means being retractable from temporary support position and out of the path of such vertically movable cutting means,
   whereby on fixing the sheet material at such plane by the means behind such plane, after retracting the retractable means from their support position, the cutting means may be moved vertically and unimpeded over such support position.

2. A machine for supporting sheet board material in performing linear grooving, cutting and like operations thereon, comprising
   a vertical frame member,
   a planar back-up surface supported thereby and establishing a vertical plane at which such sheet board material may be securely held in a support position, said back-up surface having a plurality of spaced apertures and longitudinally extending slots along its lower margin,
   vacuum cups positioned within and extending through the spaced apertures, said vacuum cups being connectable behind the support plane to a source of vacuum,
   a beam extending longitudinally in front of said vertical frame member and mounted thereto for movement in a vertical path,
   a plurality of tool holding carriages mounted on said vertically movable beam, said carriages being adjustable along the length of said movable beam and fixable at selected positions therealong by clamping means secured to said carriage,
   a cutting tool mounted in each of said carriages,
   rectractable guide plates positioned in registration with said longitudinally extending slots in said back-up surface,
   means to position said guide plates to project forwardly through said longitudinal extending slots substantially the thickness of the sheet material, thereby to support such sheet material temporarily while its longitudinal alignment at such vertical plane is set, and to retract aft and thereby to move such guide plates out of the path of the vertically movable cutting tools, and
   means to drive said movable beam along its vertical path over the retractable guide plates.

3. A machine for supporting sheet board material and performing linear grooving, cutting and like operations thereon, comprising
   V-type cutting means movable in a vertical path,
   means to vary the longitudinal position of said cutting means including
   movable beam means extending from a first end adjacent to a reference point and terminating in a second end remotely therefrom, and
   tool holding carriage means mounted for adjustable fixation linearly along said movable beam means between said reference point and said second end, said carriage means having said V-type cutting means mounted therein,
   means supportive of said cutting means and said longitudinal positioning means to establish a vertical plane at which such sheet board material may be held in a support position,
   means behind said vertical plane to fix such sheet board material at such support position, means positionable to project laterally from the front of said plane along the lower margin of such support position, whereby to support such sheet material temporarily while its longitudinal alignment at such vertical plane is set, such positionable means being retractable from temporary support position and out of the path of such vertically movable cutting means, together with indicia means carried by said carriage means and having an end fixed at the reference point to indicate linear distance therefrom, and compensating index means on said carriage means for adjustably compensating the indications of said indicia means for the thickness of sheet board material to be cut.

4. A machine for supporting sheet board material and performing linear grooving, cutting and like operations thereon, comprising a vertical frame member establishing a vertical plane at which such sheet board material may be securely held in a support position, a first beam extending longitudinally in front of said vertical frame member and mounted thereto for movement along a vertical path, said beam extending from a first end adjacent to a first reference point and terminating in a second end remotely therefrom, a first tool holding carriage mounted on said vertically movable beam, said carriage being adjustable linearly along the length of said beam between said first reference point and said second end, clamping means carried by said first tool holding carriage for fixing it at selected positions along said first beam, a first cutting tool securely attached to said first tool holding carriage, vacuum cups mounted within said vertical frame member and presented to contact the sheet board material set in said vertical plane, a first set of guide plates mounted to said vertical frame member along a lower margin portion thereof and projecting forwardly therefrom substantially the thickness of the sheet material to be cut, said guide plates extending longitudinally and being retractable from such projecting position out of the path of the cutting tool, a first variable length tape measure carried by said first tool holding carriage and having one of its ends fixed at said first reference point, a first extendible indexing tab adjustably mounted on said tool holding carriage and extendible to index positions corresponding to the thickness of the sheet material to be cut, a second beam extending vertically in front of said vertical frame member and mounted thereto for movement in a longitudinal path, said second movable beam extending from an end adjacent to a second reference point corresponding to the lower margin position of said retractable guide plates and terminating at its other end remotely therefrom, a second tool holding carriage mounted for adjustable fixation linearly along said longitudinally movable beam between said second reference point and the terminating end of said second beam, clamping means carried by said second tool holding carriage for fixing it at selected positions along said second beam, a second cutting tool mounted on said second tool holding carriage, a second set of guide plates mounted to said vertical frame member and extending vertically at a position corresponding to said first reference point, a second variable length tape measure carried by said first tool holding carriage and having one of its ends fixed at said second reference point, and a second extendible indexing tab adjustably mounted on said second tool holding carriage and extendible to index positions corresponding to the thickness of the sheet material to be cut.

5. A machine for supporting rectangular flat sheet board material and performing linear grooving and like cutting operations thereon, comprising cutting means movable in a specified linear path, means to vary the position of said cutting means transversely to the direction of its movement including movable beam means extending transversely to the direction of movement of said cutting means, said movable beam means extending from a first end adjacent to a reference point and terminating in a second end remotely therefrom, and tool holding carriage means mounted for adjustable fixation linearly along said movable beam means between said reference point and said second end, cutting means mounted in said carriage means, means supportive of said cutting means and said movable beam means to establish a support plane at which said sheet board material may be held in a support position with one edge aligned adjacent to said reference point, means behind said support plane to fix such sheet board material at the support position, means to align an adjacent edge of such sheet board material transversely to the path of said movable cutting means, together with, indicia means carried by said carriage means and having an end fixed at the reference point to indicate linear distance therefrom, and compensating index means on said carriage means for adjustably compensating the indications of said indicia means for the thickness of sheet board material to be cut.

6. Apparatus for making cuts into flat sheet material, comprising movable beam means extending from a first end adjacent to a reference point and terminating in a second end remotely therefrom, tool holding carriage means mounted for adjustable fixation linearly along said movable beam means between said reference point and the second end, a V-type cutting tool mounted in said carriage means, indicia means carried by said carriage means and having an end fixed at the reference point to indicate linear distance therefrom, and compensating index means on said carriage means for adjustably compensating the indications of said indicia means for the thickness of material to be cut.

7. Apparatus for making V-cuts into flat sheet material, comprising movable beam means extending from and adjacent to an inboard reference point and terminating in a second end remotely therefrom, a plurality of tool holding carriage means mounted for adjustable fixation linearly along said beam means between said inboard reference point and the second end of the beam, a V-type cutting tool mounted in each said carriage means, indicia means carried by each of said carriage means, compensating index means carried by said carriage means to adjustably compensate the indication of the indicia means for the thickness of the material cut, each said compensating index means further including means to establish a subsequent reference point linearly outboard of said inboard reference point, each of said indicia means having an end fixed at the reference point adjacently inboard of the tool holding carriage means by which said indicia means is carried.

8. The apparatus of claim 7, wherein the compensating index means comprises a face plate attached to each of said tool holding means and having a pair of index slots symmetrical about a plane passing through the center of said tool holding carriage means and transversely to said movable beam means, each of said index slots having indexed notches formed therealong, index pins slideable along said index slots and securable within said indexed notches, one index pin being attached to the end of said indicia means carried by the adjacent tool holding means outboard thereof, and an extensible indexing tab attached to the other index pin and slideable therewith, said other indexing tab extending laterally from the plane of symmetry of said tool holding carriage means above said indicia means and being extensible to partially cover the indicia thereon, whereby the linear position of each tool holding carriage means with respect to the reference point inboard thereof may be varied to compensate for changes of thickness of the material to be cut.

9. The apparatus of claim 7, wherein the compensating index means comprises a face plate attached to said tool holding means and having an index slot therein, said index slot having indexed notches formed therealong, an index pin slideable along said index slot and securable within said indexed notches of said slot, an extensible indexing tab attached to said index pin and slideable therewith, said tab being extendible above said indicia means to partially cover its indicia from view, and a reading window in said face plate, together with overall measuring means having linearly graduated indicia secured to said movable beam means and extending lengthwise through said tool holding carriage means, whereby to display its indicia through said reading window.

10. Apparatus for making cuts in flat sheet material, comprising movable beam means extending from a first end adjacent to a reference point and terminating in a second end remotely therefrom, a first and second tool holding carriage mounted for adjustable fixation linearly along said movable beam means between said reference point and the terminating end thereof for mounting cutting tools, said first tool holding carriage characterized by a face plate including a pair of index slots symmetrical about a plane passing through the center of said first tool holding carriage and transversely to said movable beam means, each of said index slots having indexed notches formed therealong, a first variable length indicia means carried by said first tool holding carriage and having an end fixed at the reference point, said first indicia means indicating the linear distance between said reference point and a first cut to be made in such sheet material, first and second index pins slideable along said index slots and securable within said indexed notches, and an extensible indexing tab attached to said first index pins and slideable therewith, said tab being extendible laterally from the plane of symmetry of said tool holding carriage means to partially cover said first variable length indicia means, said second tool holding carriage characterized by a face plate having an index slot therein, said index slot having indexed notches formed therealong, and an extensible indexing tab attached to said index pin and slideable therewith, said tab being extendible above said variable length indicia means, a reading window in said face plate, together with an overall measuring means having linearly graduated indicia secured to said movable beam means and extending lengthwise through said holding carriage means, whereby to display its indicia through said reading window, and a second variable length indicia means carried by said second tool holding carriage and having an end fixed to said second index pin of said first tool holding carriage, said second indicia means indicating the linear distance between the first cut made by the cutting tool mounted on said first tool holding carriage and the cut made by the cutting tool mounted on said second tool holding carriage.

11. Apparatus for making V-cuts in flat sheet material, comprising a beam extending from a first end adjacent to a reference point and terminating in a second end remotely therefrom, said beam being movable in a direction transversely to said direction of extension, a tool holding carriage mounted on said movable beam between the reference point and its second end, and having clamping means secured thereto for adjustably fixing it along the length of said movable beam at selected positions, a V-type cutting tool mounted in said carriage, a tape reel carried by said tool holding carriage, a variable length tape measure housed within said tape reel and coilable therein when retracted, said tape having a reference indicia end affixed at the reference point, whereby the position of said tool holding carriage may be selected and the linear distance between such position and the reference point is indicated by said variable length tape measure, and an extendible indexing tab adjustably secured to said tool holding carriage and extendable to selected index positions corresponding to the thickness of sheet material to be cut, said tab partially covering said tape measure when extended to compensate for changes of thickness of the material to be cut.

References Cited by the Examiner

UNITED STATES PATENTS

| | | | |
|---|---|---|---|
| 532,822 | 1/1885 | Saltzkorn et al. | 83—5 |
| 2,436,111 | 2/1948 | Lowe | 83—5 X |
| 2,793,471 | 5/1957 | Motoharu Kurata et al. | 225—96.5 X |
| 2,931,401 | 4/1960 | Lamber | 143—47 X |
| 2,992,662 | 7/1961 | Heffern | 143—47 |
| 3,111,148 | 11/1963 | Herrman et al. | 143—47 X |

WILLIAM W. DYER, JR., *Primary Examiner.*

J. M. MEISTER, *Assistant Examiner.*